United States Patent
Liu et al.

(10) Patent No.: US 10,511,428 B2
(45) Date of Patent: *Dec. 17, 2019

(54) APPARATUS AND METHOD FOR PERIODIC CHANNEL STATE REPORTING IN A WIRELESS NETWORK

(71) Applicant: Samsung Electronics Co., Ltd., Suwon-si, Gyeonggi-do (KR)

(72) Inventors: Lingjia Liu, Allen, TX (US); Young-Han Nam, Plano, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/834,147

(22) Filed: Aug. 24, 2015

(65) Prior Publication Data

US 2015/0365219 A1 Dec. 17, 2015

Related U.S. Application Data

(63) Continuation of application No. 13/313,831, filed on Dec. 7, 2011, now Pat. No. 9,119,101.

(Continued)

(51) Int. Cl.
*H04L 5/00* (2006.01)
*H04W 24/10* (2009.01)
*H04W 72/12* (2009.01)

(52) U.S. Cl.
CPC .......... *H04L 5/0057* (2013.01); *H04W 24/10* (2013.01); *H04W 72/1242* (2013.01)

(58) Field of Classification Search
CPC ............................. H04W 24/00; H04W 72/00
See application file for complete search history.

(56) References Cited

U.S. PATENT DOCUMENTS 6,473,467 B1 10/2002 Wallace et al.
8,687,555 B2 * 4/2014 Ko .................... H04L 1/0026
370/328

(Continued)

FOREIGN PATENT DOCUMENTS

CN 101772050 7/2010
CN 101873206 10/2010
(Continued)

OTHER PUBLICATIONS

Motorola, R1-106295, 3GPP TSG RAN WG1 #63, Nov. 15-19, 2010.*

(Continued)

*Primary Examiner* — Andrew Lai
*Assistant Examiner* — Sumitra Ganguly

(57) ABSTRACT

Channel State Information (CSI) is reported by a subscriber station to a base station. The CSI is reported periodically for at least two physical uplink control channels (PUCCH). In case of a collision between a report for a first PUCCH and a report for the second PUCCH, each of the report types is partitioned into one of a number of classes, which include: a first class for rank indicator related report types and wideband (WB) W1 report types; a second class for WB report types or WB channel quality indicator report types; and a third class for subband related report types or W1 report types. A priority rule assigns a priority to each of the classes. The CSI feedback reports are transmitted according to the priority rule such that the report type included in a higher class is transmitted and the report type included in the lower class are dropped.

8 Claims, 5 Drawing Sheets

Related U.S. Application Data

(60) Provisional application No. 61/424,528, filed on Dec. 17, 2010.

(56) References Cited

U.S. PATENT DOCUMENTS

| | | | |
|---|---|---|---|
| 9,119,101 B2* | 8/2015 | Liu | H04W 24/10 |
| 2010/0098012 A1 | 4/2010 | Bala et al. | |
| 2010/0234037 A1 | 9/2010 | Terry et al. | |
| 2011/0141928 A1* | 6/2011 | Shin | H04L 1/0028 370/252 |
| 2011/0242982 A1* | 10/2011 | Lunttila | H04L 5/001 370/241 |
| 2012/0140708 A1* | 6/2012 | Choudhury | H04W 72/082 370/328 |
| 2013/0089064 A1 | 4/2013 | Ding et al. | |

FOREIGN PATENT DOCUMENTS

| | | |
|---|---|---|
| JP | 2013531399 A | 8/2013 |
| KR | 10-2005-0109009 A | 11/2005 |

OTHER PUBLICATIONS

CR0270, R1-106557, 3GPP TSG RAN WG1 #63, Nov. 15-19, 2010.*

CR0270, R!-106557, 3GPP TSG RAN WG1 #63, Nov. 15-19, 2010. (Year: 2010).*

Motorola, R1-106295, 3GPP TSG RAN WG1 #63, Nov. 15-19, 2010 (Year: 2010).*

CR0270, R1-106557, 3GPP TSG RAN WG1 #63, Nov. 15-19, 2010. (Year: 2010).*

Chinese Office Actions issued for CN 2011800605793.5 dated Feb. 3, 2016, 16 pgs.

Notice of Patent Grant issued for JP 2013-544402 dated Feb. 15, 2016, 5 pgs.

European Office Action issue for EP 11194034.2 dated Feb. 25, 2016, 8 pgs.

Motorola, "Periodic CQI Reporting for CA", R1-106295, 3GPP TSG RAN WG1 #63, Nov. 1, 2010, 2 pgs.

Nokia Siemens Networks, Periodic CSI Reporting for Carrier Aggregation:, R1-104435, 3GPP TSG RAN WG1 Meeting #62, Aug. 17, 2010, 2 pgs.

CATR, "Periodic CQI Feedback on PUCCH for LTE-A", 3GPP TSG RAN WG1 Meeting #63, Nov. 10, 2010, 3 pgs.

Japanese Office Action dated Oct. 19, 2015 in connection with Japense Application No. 2013-544402; 4 pages.

Australian Office Action dated Sep. 14, 2015 in connection with Australian Application No. 2011341831; 3 pages.

3GPP TSG RAN WG1 Meeting #64; "Priority rules for periodic CSI feedback in carrier aggregation"; R1-110735; Samsung; Taipei, Taiwan; Feb. 21-25, 2011; 4 pages.

3GPP TSG RAN WG1 Meeting #63; "periodic CQI feedback on PUCCH for LTE-A"; R1-106271; CATR; Jacksonville, USA; Nov. 15-19, 2010; 2 pages.

Patent Examination Report No. 2 dated Apr. 18, 2016 in connection with Australian Patent Application No. 2011341831, 3 pages.

Indonesian Office Action dated Aug. 18, 2016 in connection with Indonesian Application No. IDW-00201303259, 4 pages.

Second Office Action dated Oct. 11, 2016 in connection with Chinese Application No. 201180060579.5, 12 pages.

Australina Notice of Acceptance dated Sep. 5, 2016 in connection with Australian Application No. 2011341831, 2 pages.

Korean Office Action for Korean Application No. 10-2013-7018374, dated Sep. 19, 2017. (8 pages).

Qualcomm Incorporated, "PMI/CQI/RI configuration in support of CA"; 3GPP TSG RAN WG1 #63, R1-106344, Nov. 15-19, 2010, Jacksonville, USA. (3 pages).

Ericsson, et al., "Periodic CSI reporting for CA"; 3GPP TSG RAN WG1 Meeting #63, R1-105858, Nov. 15-19, 2010, Jacksonville, USA. (3 pages).

Communication from a foreign patent office in a counterpart foreign application, Korean Intellectual Property Office, "Notice of Preliminary Rejection," Korean Application No. 10-2013-7018374, Mar. 22, 2018, 10 pages.

Texas Instruments, "Periodic CSI reporting for Carrier Aggregation," R1-105888, 3GPP TSG RAN WG1 #63, Jacksonville, USA, Nov. 15-19, 2010, 4 pages.

Notice of Patent Grant dated Aug. 13, 2018 in connection with Korean Patent Application No. 10-2013-7018374, 4 pages.

Intellectual Property India, "Examination report under sections 12 & 13 of the Patents Act, 1970 and the Patents Rules, 2003," Application No. IN 2072/KOLNP/2013, dated Oct. 29, 2018, 6 pages.

* cited by examiner

APPARATUS AND METHOD FOR PERIODIC CHANNEL STATE REPORTING IN A WIRELESS NETWORK

CROSS-REFERENCE TO RELATED APPLICATION(S) AND CLAIM OF PRIORITY

This application is a continuation of U.S. Non-Provisional patent application Ser. No. 13/313,831 filed Dec. 7, 2011 and entitled "APPARATUS AND METHOD FOR PERIODIC CHANNEL STATE REPORTING IN A WIRELESS NETWORK," now U.S. Pat. No. 9,119,101, which claims priority to U.S. Provisional Patent Application No. 61/424,528 filed Dec. 17, 2010 and entitled "METHOD AND APPARATUS FOR CQI/PMI/RI REPORTING FOR CARRIER AGGREGATION IN REL-10." The above-identified patent documents are hereby incorporated by reference.

TECHNICAL FIELD

The present application relates generally to wireless networks and, more specifically, to a system and method for periodic channel state reporting for carrier aggregation.

BACKGROUND

In 3$^{rd}$ Generation Partnership Project Long Term Evolution (3GPP LTE), Orthogonal Frequency Division Multiplexing (OFDM) is adopted as a downlink (DL) transmission scheme.

The 3GPP LTE (Long Term Evolution) standard is the last stage in the realization of true 4th generation (4G) mobile telephone networks. Most major mobile carriers in the United States and several worldwide carriers have announced plans to convert their networks to LTE beginning in 2009. LTE is a set of enhancements to the Universal Mobile Telecommunications System (UMTS). Much of 3GPP Release 8 focuses on adopting 4G mobile communications technology, including an all-IP flat networking architecture.

The 3GPP LTE standard uses orthogonal frequency division multiplexing (OFDM) for the downlink (i.e., from the base station to the mobile station). Orthogonal frequency division multiplexing (OFDM) is a multi-carrier transmission technique that transmits on many orthogonal frequencies (or subcarriers). The orthogonal subcarriers are individually modulated and separated in frequency such that they do not interfere with one another. This provides high spectral efficiency and resistance to multipath effects.

SUMMARY

A subscriber station capable of reporting channel characteristics to at least one base station is provided. The subscriber station includes a transceiver configured to transmit channel state information (CSI) feedback reports. The subscriber station also includes a controller configured to perform periodic CSI reporting regarding the at least two component carriers on at least two individually configured physical uplink control channels (PUCCH). In case of a collision between a first report type on a first PUCCH and a second report for second PUCCH in a same subframe, the controller is configured to determine each of the two report types to be of a number of classes. The number of classes include a first class comprising rank indicator (RI) related report types and wideband (WB) W1 report types; a second class comprising at least one of WB report types and WB channel quality indicator (CQI) report types; and a third class comprising at least one of subband (SB) related report types and W1 report types. The controller also is configured to apply a priority rule to assign a priority to one of the classes such that the controller causes the transceiver to transmit the report type included in a higher class and drop the report type included in the lower class.

A base station capable of receiving channel characteristics of at least two component carriers from at least one subscriber station is provided. The base station includes a transceiver configured to receive channel state information (CSI) feedback reports. The base station also includes a controller configured to perform evaluation of CSI reporting regarding the at least two component carriers on at least two individually configured physical uplink control channels (PUCCH). In case of a collision between a first report type on a first PUCCH and a second report type for a second PUCCH in a same subframe, the controller is configured to determine each of the two report types to be into one of a number of classes. The number of classes includes: a first class comprising rank indicator (RI) related report types and wideband (WB) W1 report types; a second class comprising at least one of WB report types and WB channel quality indicator (CQI) report types; and a third class comprising at least one of subband (SB) related report types and W1 report types. In addition, the controller is configured to apply a priority rule to determine a priority to one of the classes such that the controller identifies that the report type included in a higher class is received and the report type included in the lower class is dropped.

A method for reporting channel characteristics to at least one base station is provided. The method includes performing periodic channel state information (CSI) feedback reporting regarding the at least two component carriers on at least two individually configured physical uplink control channels (PUCCH). In case of a collision between a first report type on a first PUCCH and a second report type for a second PUCCH in a same subframe, each of the two report types is determined to be one of a number of classes. The number of classes includes a first class comprising rank indicator (RI) related report types and wideband (WB) W1 report types; a second class comprising at least one of WB report types and WB channel quality indicator (CQI) report types; and a third class comprising at least one of subband (SB) related report types and W1 report types. The method also includes applying a priority rule to assign a priority to one of the classes; and transmitting channel state information (CSI) feedback reports according to the priority rule such that the report type included in a higher class are transmitted and the report type included in the lower class are dropped.

A method for receiving channel characteristics of at least two component carriers from at least one subscriber station is provided. The method includes receiving periodic channel state information (CSI) feedback reporting regarding the at least two component carriers on at least two individually configured physical uplink control channels (PUCCH). The method also includes, in case of a collision between a first report type on a first PUCCH and a second report type for a second PUCCH in a same subframe, determining each of the report types classified into one of a number of classes. The number of classes includes: a first class comprising rank indicator (RI) related report types and wideband (WB) W1 report types; a second class comprising at least one of WB report types and WB channel quality indicator (CQI) report types; and a third class comprising at least one of subband (SB) related report types and W1 report types. Additionally, the method includes applying a priority rule to identify that the report type included in a higher class are received and the report type included in the lower class are dropped.

A wireless communication network is provided. The wireless communication network includes a plurality of base stations and a subscriber station capable of reporting Channel State Information (CSI) of at least two component carriers to at least one base station. The subscriber station includes a transceiver configured to transmit CSI feedback reports. The subscriber station also includes a controller configured to perform periodic channel quality reporting the at least two component carriers on at least two individually configured physical uplink control channels (PUCCH). In case of a collision between a first report type on a first PUCCH and a second report on a second PUCCH in a same subframe, the controller is configured to determine each of the report types to be one of a number of classes. In addition, the controller is configured to apply a priority rule to assign a priority to at least one of the classes such that the controller causes the transceiver to transmit the report type included in a higher class and drop the report type included in the lower class.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: 1) Document No. R1-101683, "Way Forward For PUCCH," November 2010; and 2) Document No. R1-106557, "CR0270 Introduction of Rel-10 features," December 2010.

In Release 10 LTE systems, a mobile station (or user equipment) performs feedback of precoder matrix index (PMI), rank indicator (RI), and channel quality indicator (CQI) to the base station or evolved NodeB (eNodeB or eNB). The feedback content and signaling details for periodic channel state information reporting (PUCCH, CQI/PMI/RI reporting) within one component carrier are finalized in Document No. R1-101683. That is, three PUCCH feedback modes to be used are: submode 1 of PUCCH 1-1, submode 2 of PUCCH 1-1, and PUCCH 2-1. According to Document No. R1-106557, the following report types are supported in Rel-10:

Type 1 report supports CQI feedback for the UE selected sub-bands.

Type 1a report supports subband CQI and second PMI feedback.

Type 2, Type 2b, and Type 2c report supports wideband CQI and PMI feedback.

Type 2a report supports wideband PMI feedback.

Type 3 report supports RI feedback.

Type 4 report supports wideband CQI.

Type 5 report supports RI and wideband PMI feedback.

Type 6 report supports RI and PTI feedback.

Currently, no method has been identified to transmit periodic CQI/PMI/RI feedback for a carrier aggregation case. Accordingly, there are two outstanding issues related to the periodic channel reporting in the carrier aggregation for the case of only periodic CQI/PMI/RI without acknowledgment (ACK)/Negative Acknowledgment (NACK) (ACK/NACK or A/N) transmission in a subframe depending on the availability of the PUSCH resource. Embodiments of the present disclosure are configured to determine to which downlink component carrier the report should correspond when no PUSCH resource is available and CQI/PMI/RI is reported for only one downlink component carrier in one subframe. In addition, embodiments of the present disclosure are configured to illustrate how a subscriber station reports CQI/PMI/RI from multiple DL CCs on the PUSCH when a PUSCH resource is available.

Figure 1:
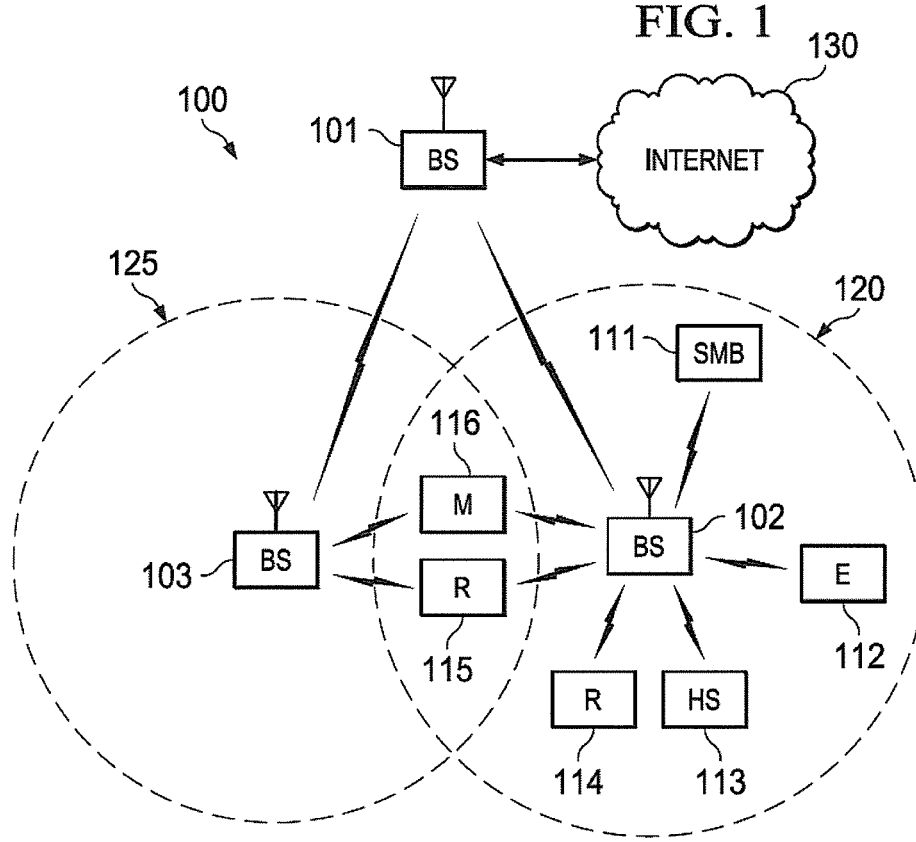
FIG. 1 illustrates an exemplary wireless network that performs feedback for the PUCCH and the PUSCH according to the principles of the present disclosure.

FIG. 1 illustrates exemplary wireless network 100, which performs feedback for the physical uplink control channel (PUCCH) and physical uplink shared channel (PUSCH) according to the principles of the present disclosure. In the illustrated embodiment, wireless network 100 includes base station (BS) 101, base station (BS) 102, base station (BS)

103, and other similar base stations (not shown). Base station 101 is in communication with Internet 130 or a similar IP-based network (not shown).

Depending on the network type, other well-known terms may be used instead of "base station," such as "eNodeB" or "access point." For the sake of convenience, the term "base station" shall be used herein to refer to the network infrastructure components that provide wireless access to remote terminals.

Base station 102 provides wireless broadband access to Internet 130 to a first plurality of mobile stations (or user equipment) within coverage area 120 of base station 102. The first plurality of mobile stations includes mobile station 111, which may be located in a small business (SMB), mobile station 112, which may be located in an enterprise (E), mobile station 113, which may be located in a WiFi hotspot (HS), mobile station 114, which may be located in a first residence (R), mobile station 115, which may be located in a second residence (R), and mobile station 116, which may be a mobile device (M), such as a cell phone, a wireless laptop, a wireless PDA, or the like.

For sake of convenience, the term "mobile station" is used herein to designate any remote wireless equipment that wirelessly accesses a base station, whether or not the mobile station is a truly mobile device (e.g., cell phone) or is normally considered a stationary device (e.g., desktop personal computer, vending machine, etc.). Other well-known terms may be used instead of "mobile station," such as "subscriber station (SS)," "remote terminal (RT)," "wireless terminal (WT)," "user equipment (UE)," and the like.

Base station 103 provides wireless broadband access to Internet 130 to a second plurality of mobile stations within coverage area 125 of base station 103. The second plurality of mobile stations includes mobile station 115 and mobile station 116. In an exemplary embodiment, base stations 101-103 may communicate with each other and with mobile stations 111-116 using OFDM or OFDMA techniques.

While only six mobile stations are depicted in FIG. 1, it is understood that wireless network 100 may provide wireless broadband access to additional mobile stations. It is noted that mobile station 115 and mobile station 116 are located on the edges of both coverage area 120 and coverage area 125. Mobile station 115 and mobile station 116 each communicate with both base station 102 and base station 103 and may be said to be operating in handoff mode, as known to those of skill in the art.

Exemplary descriptions of closed-loop transmit beamforming schemes based on codebook design can be found in: 1) D. Love, J. Heath, and T. Strohmer, "Grassmannian Beamforming For Multiple-Input, Multiple-Output Wireless Systems," IEEE Transactions on Information Theory, October 2003, and 2) V. Raghavan, A. M. Sayeed, and N. Boston, "Near-Optimal Codebook Constructions For Limited Feedback Beamforming In Correlated MIMO Channels With Few Antennas," IEEE 2006 International Symposium on Information Theory. Both references are hereby incorporated by reference into this disclosure as if fully set forth herein.

Closed-loop codebook-based transmit beamforming may be used in a case where a base station forms a transmit antenna beam toward a single user or simultaneously toward multiple users at the same time and at a certain frequency. An exemplary description of such a system may be found in Quentin H. Spencer, Christian B. Peel, A. Lee Swindlehurst, Martin Harrdt, "An Introduction To the Multi-User MIMO Downlink," IEEE Communication Magazine, October 2004, which is hereby incorporated by reference into this disclosure as if fully set forth herein.

A codebook is a set of pre-determined antenna beams that are known to mobile stations. A codebook-based pre-coding MIMO may provide significant spectral efficiency gain in the downlink closed-loop MIMO. In the IEEE 802.16e and 3GPP LTE standards, a four transmit (4-TX) antenna limited feedback based closed-loop MIMO configuration is supported. In IEEE 802.16m and 3GPP LTE Advanced standards, in order to provide peak spectral efficiency, eight transmit (8-TX) antenna configurations are proposed as a prominent precoding closed-loop MIMO downlink system. Exemplary descriptions of such systems may be found in 3GPP Technical Specification No. 36.211, "Evolved Universal Terrestrial Radio Access (E-UTRA): Physical Channel and Modulation," which is hereby incorporated by reference into this disclosure as if fully set forth herein.

To eliminate the need for the phase calibration process in cases where channel sounding signals or common pilot signals (or midamble) are not used for data demodulation purpose, closed-loop transformed codebook-based transmit beamforming may be utilized. An exemplary description of such a system may be found in IEEE C802.16m-08/1345r2, "Transformation Method For Codebook Based Precoding," November 2008, which is hereby incorporated by reference into this disclosure as if fully set forth herein. The transformed codebook method utilizes the channel correlation information to enhance the performance of the standard codebook, especially in the highly correlated channels, as well as to eliminate the need of phase calibration among multiple transmit antennas. Typically, the channel correlation information is based on second-order statistics and thus changes very slowly, which is similar to long-term channel effects, such as shadowing and path loss. As a result, the feedback overhead and computation complexity using correlation information are very small.

Figure 2:
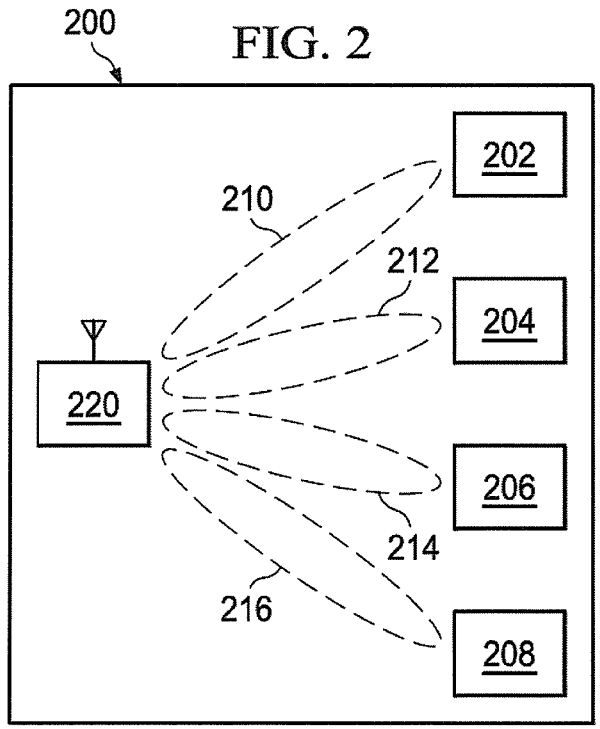
FIG. 2 illustrates a base station in communication with a plurality of mobile stations according to an embodiment of the disclosure.

FIG. 2 illustrates a diagram 200 of a base station 220 in communication with a plurality of mobile stations 202, 404, 406, and 408 according to an embodiment of this disclosure.

As shown in FIG. 2, base station 220 simultaneously communicates with multiple of mobile stations through the use of multiple antenna beams, each antenna beam is formed toward its intended mobile station at the same time and same frequency. Base station 220 and mobile stations 202, 204, 206, and 208 are employing multiple antennas for transmission and reception of radio wave signals. The radio wave signals can be Orthogonal Frequency Division Multiplexing (OFDM) signals.

In this embodiment, base station 220 performs simultaneous beamforming through a plurality of transmitters to each mobile station. For instance, base station 220 transmits data to mobile station 202 through a beamformed signal 210, data to mobile station 204 through a beamformed signal 212, data to mobile station 406 through a beamformed signal 214, and data to mobile station 408 through a beamformed signal 216. In some embodiments of this disclosure, base station 220 is capable of simultaneously beamforming to the mobile stations 202, 204, 206, and 208. In some embodiments, each beamformed signal is formed toward its intended mobile station at the same time and the same frequency. For the purpose of clarity, the communication from a base station to a mobile station may also be referred to known as downlink communication and the communication from a mobile station to a base station may be referred to as uplink communication.

Base station 220 and mobile stations 202, 204, 206, and 208 employ multiple antennas for transmitting and receiving wireless signals. It is understood that the wireless signals may be radio wave signals, and the wireless signals may use any transmission scheme known to one skilled in the art, including an Orthogonal Frequency Division Multiplexing (OFDM) transmission scheme.

Mobile stations 202, 204, 206, and 208 may be any device that is capable receiving wireless signals. Examples of mobile stations 202, 204, 206, and 208 include, but are not limited to, a personal data assistant (PDA), laptop, mobile telephone, handheld device, or any other device that is capable of receiving the beamformed transmissions.

The OFDM transmission scheme is used to multiplex data in the frequency domain. Modulation symbols are carried on frequency sub-carriers. The quadrature amplitude modulation (QAM) modulated symbols are serial-to-parallel converted and input to the inverse fast Fourier transform (IFFT). At the output of the IFFT, N time-domain samples are obtained. Here N refers to the IFFT/fast Fourier transform (FFT) size used by the OFDM system. The signal after IFFT is parallel-to-serial converted and a cyclic prefix (CP) is added to the signal sequence. CP is added to each OFDM symbol to avoid or mitigate the impact due to multipath fading. The resulting sequence of samples is referred to as an OFDM symbol with a CP. At the receiver side, assuming that perfect time and frequency synchronization are achieved, the receiver first removes the CP, and the signal is serial-to-parallel converted before being fed into the FFT. The output of the FFT is parallel-to-serial converted, and the resulting QAM modulation symbols are input to the QAM demodulator.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

Because each OFDM symbol has finite duration in time domain, the sub-carriers overlap with each other in frequency domain. However, the orthogonality is maintained at the sampling frequency assuming the transmitter and receiver have perfect frequency synchronization. In the case of frequency offset due to imperfect frequency synchronization or high mobility, the orthogonality of the sub-carriers at sampling frequencies is destroyed, resulting in inter-carrier-interference (ICI).

The use of multiple transmit antennas and multiple receive antennas at both a base station and a single mobile station to improve the capacity and reliability of a wireless communication channel is known as a Single User Multiple Input Multiple Output (SU-MIMO) system. A MIMO system promises linear increase in capacity with K where K is the minimum of number of transmit (M) and receive antennas (N) (i.e., K=min(M,N)). A MIMO system can be implemented with the schemes of spatial multiplexing, a transmit/receive beamforming, or transmit/receive diversity.

Figure 3:
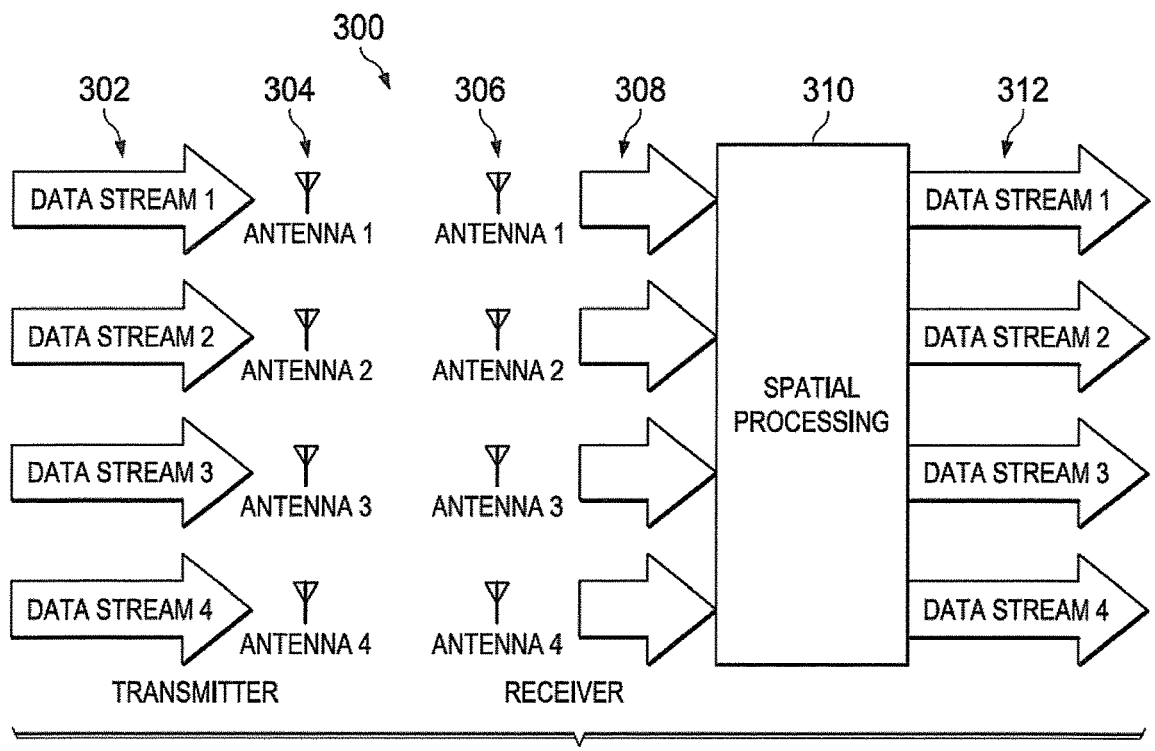
FIG. 3 illustrates a 4×4 multiple-input, multiple-output (MIMO) system according to an embodiment of the present disclosure.

FIG. 3 illustrates a 4×4 multiple-input, multiple-output (MIMO) system 300 according to an embodiment of the present disclosure. In this example, four different data streams 302 are transmitted separately using four transmit antennas 304. The transmitted signals are received at four receive antennas 306 and interpreted as received signals 308. Some form of spatial signal processing 310 is performed on the received signals 308 in order to recover four data streams 312.

An example of spatial signal processing is Vertical-Bell Laboratories Layered Space-Time (V-BLAST), which uses the successive interference cancellation principle to recover the transmitted data streams. Other variants of MIMO schemes include schemes that perform some kind of space-time coding across the transmit antennas (e.g., Diagonal Bell Laboratories Layered Space-Time (D-BLAST)). In addition, MIMO can be implemented with a transmit-and-receive diversity scheme and a transmit-and-receive beamforming scheme to improve the link reliability or system capacity in wireless communication systems.

MIMO channel estimation consists of estimating the channel gain and phase information for links from each of the transmit antennas to each of the receive antennas. Therefore, the channel response, H, for N×M MIMO system consists of an N×M matrix, as shown below:

$$H = \begin{bmatrix} a_{11} & a_{12} & \ldots & a_{1M} \\ a_{21} & a_{22} & \ldots & a_{2M} \\ \vdots & \vdots & \ldots & \vdots \\ a_{N1} & a_{N2} & \ldots & a_{NM} \end{bmatrix}.$$

The MIMO channel response is represented by H and $a_{NM}$ represents the channel gain from transmit antenna N to receive antenna M. In order to enable the estimations of the elements of the MIMO channel matrix, separate pilots may be transmitted from each of the transmit antennas.

As an extension of single user MIMO (SU-MIMO), multi-user MIMO (MU-MIMO) is a communication scenario in which a base station with multiple transmit antennas can simultaneously communicate with multiple mobile stations through the use of multi-user beamforming schemes, such as Spatial Division Multiple Access (SDMA), to improve the capacity and reliability of a wireless communication channel.

Figure 4:
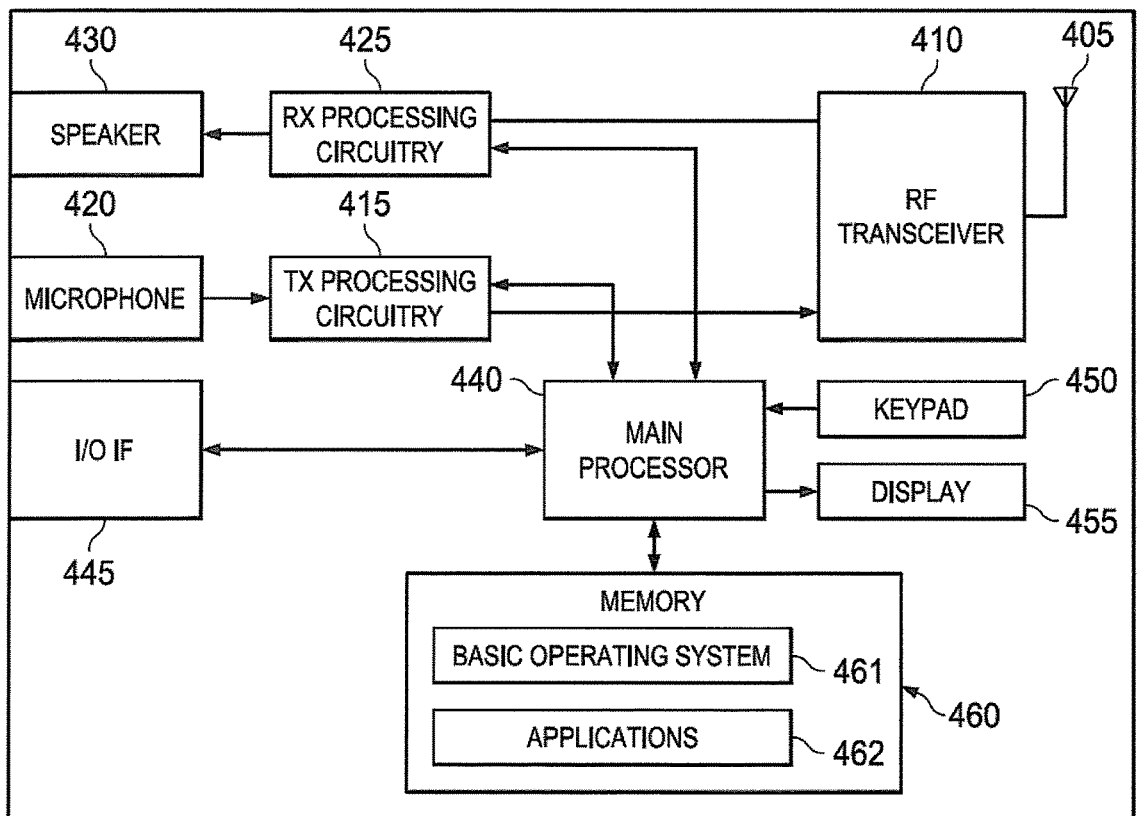
FIG. 4 illustrates an exemplary wireless subscriber station according to embodiments of the present disclosure.

FIG. 4 illustrates an exemplary wireless subscriber station according to embodiments of the present disclosure. The embodiment of wireless subscriber station 116 illustrated in FIG. 4 is for illustration only. Other embodiments of the wireless subscriber station 116 could be used without departing from the scope of this disclosure.

Wireless subscriber station 116 comprises antenna 405, radio frequency (RF) transceiver 410, transmit (TX) processing circuitry 415, microphone 420, and receive (RX) processing circuitry 425. SS 116 also comprises speaker 430, main processor 440, input/output (I/O) interface (IF) 445, keypad 450, display 455, and memory 460. Memory 460 further comprises basic operating system (OS) program 461 and a plurality of applications 462. The plurality of applications can include processes to partition feedback report types according to classes.

Radio frequency (RF) transceiver 410 receives from antenna 405 an incoming RF signal transmitted by a base station of wireless network 100. Radio frequency (RF) transceiver 410 down-converts the incoming RF signal to produce an intermediate frequency (IF) or a baseband signal. The IF or baseband signal is sent to receiver (RX) processing circuitry 425 that produces a processed baseband signal by filtering, decoding, and/or digitizing the baseband or IF signal. Receiver (RX) processing circuitry 425 transmits the processed baseband signal to speaker 430 (i.e., voice data) or to main processor 440 for further processing (e.g., web browsing).

Transmitter (TX) processing circuitry 415 receives analog or digital voice data from microphone 420 or other outgoing baseband data (e.g., web data, e-mail, interactive video game data) from main processor 440. Transmitter (TX) processing circuitry 415 encodes, multiplexes, and/or digitizes the outgoing baseband data to produce a processed baseband or IF signal. Radio frequency (RF) transceiver 410 receives the outgoing processed baseband or IF signal from transmitter (TX) processing circuitry 415. Radio frequency (RF) transceiver 410 up-converts the baseband or IF signal to a radio frequency (RF) signal that is transmitted via antenna 405.

In some embodiments of the present disclosure, main processor 440 is a microprocessor or microcontroller. Memory 460 is coupled to main processor 440. According to some embodiments of the present disclosure, part of memory 460 comprises a random access memory (RAM) and another part of memory 460 comprises a Flash memory, which acts as a read-only memory (ROM).

Main processor 440 executes basic operating system (OS) program 361 stored in memory 460 in order to control the overall operation of wireless subscriber station 116. In one such operation, main processor 440 controls the reception of forward channel signals and the transmission of reverse channel signals by radio frequency (RF) transceiver 410, receiver (RX) processing circuitry 425, and transmitter (TX) processing circuitry 415, in accordance with well-known principles.

Main processor 440 is capable of executing other processes and programs resident in memory 460, such as operations for partitioning feedback report types according to classes, including RI related, WB CQI related, W1 and WB CQI based on PTI+SB related reports. Main processor 440 can move data into or out of memory 460, as required by an executing process. In some embodiments, the main processor 440 is configured to execute a plurality of applications 462, such as applications for partitioning feedback report types according to classes. The main processor 440 can operate the plurality of applications 462 based on OS program 461 or in response to a signal received from BS 102. Main processor 440 is also coupled to I/O interface 445. I/O interface 445 provides subscriber station 116 with the ability to connect to other devices such as laptop computers and handheld computers. I/O interface 445 is the communication path between these accessories and main controller 440.

Main processor 440 is also coupled to keypad 450 and display unit 455. The operator of subscriber station 116 uses keypad 450 to enter data into subscriber station 116. Display 455 may be a liquid crystal display capable of rendering text and/or at least limited graphics from web sites. Alternate embodiments may use other types of displays.

Figure 5:
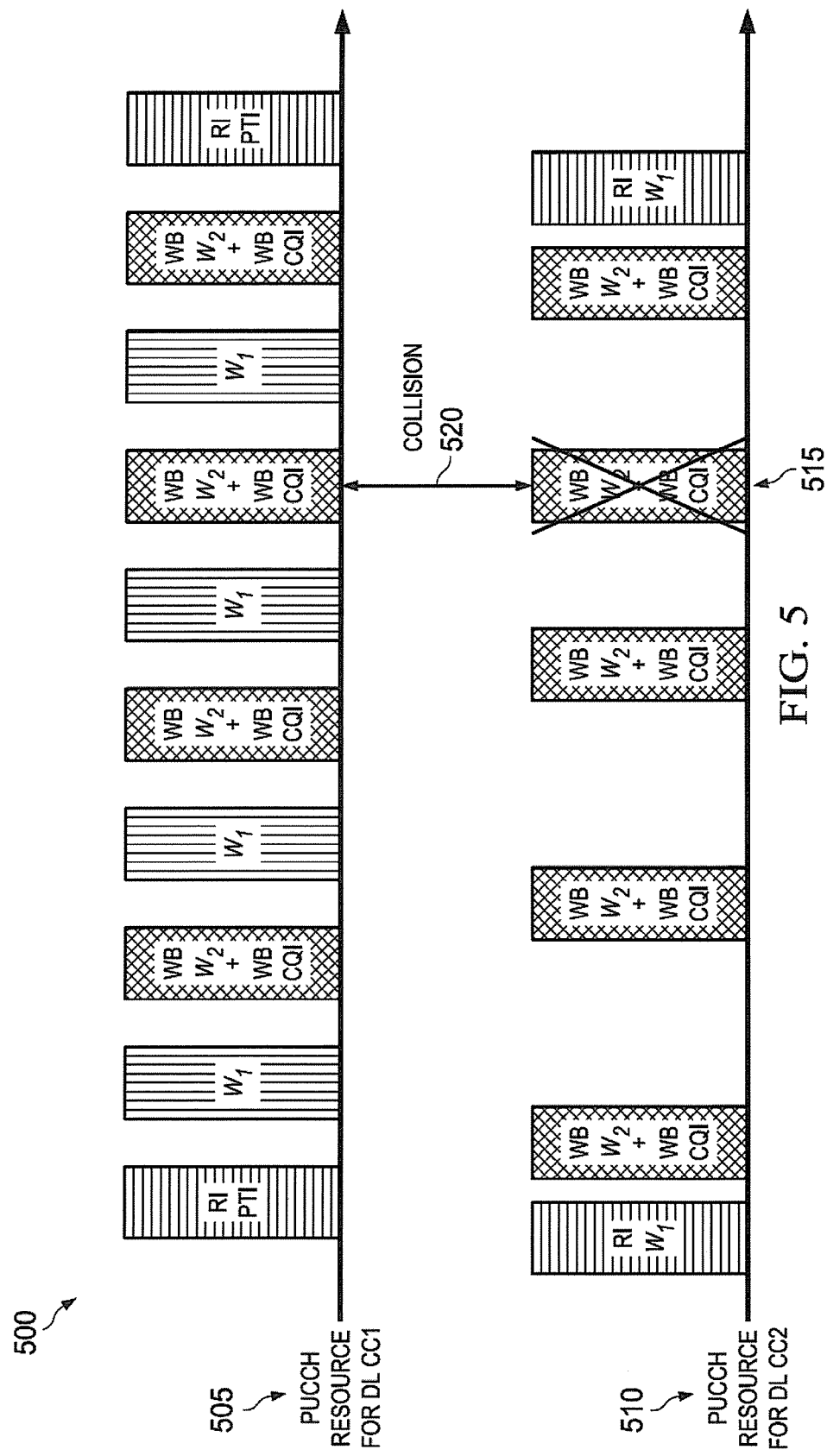
FIG. 5 illustrates independent PUCCH feedback processes for downlink component carriers according to embodiments of the present disclosure.

FIG. 5 illustrates independent PUCCH feedback processes for downlink component carriers according to embodiments of the present disclosure. The embodiment of the PUCCH feedback processes 500 shown in FIG. 5 is for illustration only. Other embodiments could be used without departing from the scope of this disclosure.

In carrier aggregation, for periodic CQI/PMI/RI reporting, the set of Rel-8 higher-layer configuration parameters are independently configured for each downlink (DL) component carrier (CC): DL CC1 505 and DL CC2 510. This means that each downlink component carrier will have an independent PUCCH feedback process. Since DL CC1 505 and DL CC2 510 are each independently configured for PUCCH feedback, feedback instance might collide. That is, there exist some subframes where SS 116 needs to report CQI/PMI/RI for multiple downlink component carriers. For example, at a certain time instance 515, the PUCCH feedback for DL CC1 505 collides 520 with the PUCCH feedback for DL CC2 510.

When no PUSCH resource is available, the network can schedule a PUSCH resource in the subframes where collision 520 occurs between PUCCH resources from DL CC1 505 and DL CC2 510 using a code-point of the DL control information. In this way, the feedback information related to the collided PUCCH transmission can be protected without information loss. By scheduling the PUSCH in this manner, the important feedback information such as rank indicator related information (for example, report type 3, report type 5, and report type 6) can be protected.

Alternatively, when no PUSCH resource is available, a priority rule is provided for the feedback content to be carried over different PUCCH resources to decide which content is to be transmitted by SS 116. In addition, the priority rule identifies on which PUCCH the content is to be carried.

In certain embodiments, SS 116 selects the feedback content to be transmitted in a subframe. If a collision 520 occurs, the selected feedback content will be transmitted in one PUCCH resource.

For example, the corresponding PUCCH resource carrying the selected feedback content indicates the information related to which component carrier the PUCCH Channel State information (CSI) feedback corresponds. Therefore, in one example, the one PUCCH resource used by SS 116 is the corresponding PUCCH resource originally scheduled by BS 102 through radio resource control (RRC).

In another example, the one PUCCH resource used by SS 116 is the PUCCH resource having the lowest PUCCH resource number $n_{PUCCH}^{(2)}$ among the PUCCH resources for CSI feedback that collide 520 in the subframe.

In another example, the one PUCCH resource is the PUCCH resource having the lowest PUCCH resource number $n_{PUCCH}^{(2)}$ among the all configured PUCCH resources for CSI feedback.

In another example, the one PUCCH resource is the PUCCH resource having the highest PUCCH resource number $n_{PUCCH}^{(2)}$ among the PUCCH resources for CSI feedback which collides in the subframe.

In another example, the one PUCCH resource is the PUCCH resource having the highest PUCCH resource number $n_{PUCCH}^{(2)}$ among the all configured PUCCH resources for CSI feedback.

In addition, implementation complexity can be reduced by using one of the previous examples illustrated.

In certain embodiments, the report types are partitioned into three priority classes. The partition of the report types is based on the importance of the report content and its relevance to the other reports. For example, a rank report is important because it affects a following PMI report and CQI report. Additionally, a wideband CQI/PMI report is important because it affects allowing subband CQI/PMI reports. Accordingly, the priority rule for the feedback content depends on the feedback type that is scheduled to be carried in the corresponding PUCCH resources.

In one example for partitioning the report types, SS 116 partitions the feedback types according RI related types, wide band (WB) feedback related type, and sub-band (SB) feedback related types. For example, for all the report types listed in Document No. R1-106557, "CR0270 Introduction of Rel-10 features", SS 116 applies the following partition:

Class 1, which is RI related, includes: a Type 3 report, a Type 5 report, and a Type 6 report;

Class 2, which is WB related, includes: a Type 2 report, a Type 2a report, a Type 2b report, a Type 2c report, and a Type 4 report; and Class 3, which is SB related, includes: Type 1 report, and Type 1a.

In addition, a priority list is defined according to the class number. Further, where ">" indicates the higher priority order, such as, Class A>Class B means Class A report has higher priority than Class B report. Accordingly, Class 1>Class 2>Class 3. Class 1 reports retain the highest priority in the priority list because the Class 1 reports are those reports related to rank indicator. Those reports usually have relatively long reporting period and convey more important feedback information that affects the following Class 2 and Class 3 reports (if any). If Class 1 reports are dropped, a much longer time is required for the network to retrieve the information compared to Class 2 and Class 3 report types. Similarly, Class 2 (WB related feedback) reports have a relatively longer feedback period than Class 3 reports in the same feedback mode. Furthermore, class 2 reports convey information that may affect the class 3 report that follows the class 2 report.

In another example of partitioning the report types, SS 116 partitions the feedback types according RI related and WB W1, WB CQI feedback related, and SB feedback related. For example, for all the report types listed in Document No. R1-106557, "CR0270 Introduction of Rel-10 features", SS 116 applies the following partition:

Class 1, which is RI related+WB W1, includes: a Type 2a report, a Type 3 report, a Type 5 report, and a Type 6 report;

Class 2, which is WB CQI related, includes: a Type 2 report, a Type 2b report, a Type 2c report, and a Type 4 report; and Class 3, which is SB related, includes: Type 1 report, and Type 1a.

The Type 2a report is included in Class 1 (RI related+WB W1) since the Type 2a report is for wideband PMI feedback, which is transmitted only when the value of the precoder type indicator (PTI) is set to be "0" and the Type 2a report will affect the Type 2b reports that follow. Therefore, the Type 2a report is more important as compared to with other WB related report types and, as such, requires a better protection and a higher priority.

In another example of partitioning the report types, the feedback types are partitioned according RI related, WB CQI related, W1, and WB CQI based on PTI+SB related reports. For example, for all the report types listed in Document No. R1-106557, "CR0270 Introduction of Rel-10 features", SS 116 applies the following partition:

Class 1 (RI related): Type 3 report, Type 5 report, and Type 6 report;

Class 2 (WB CQI related): Type 2 report, and Type 4 report1;

Class 3 (W1): Type 2a report;

Class 4 (WB CQI based on PTI+SB CQI related): Type 2b report, Type 2c report, Type 1 report, and Type 1a report Accordingly, the network 100 applies the following rule: Class 1>Class 2>Class 3>Class 4.

As such, there exists a higher priority for the feedback types related to WB CQI for PUCCH mode 1-1 compared to the WB CQI reports for PUCCH mode 2-1. That is, the priority of WB CQI for PUCCH mode 2-1 is the same as that for the SB CQI related feedback. This similarity in priority is a result of the feedback content for the corresponding PUCCH reporting resources actually depending upon the value of PTI as illustrated in FIG. 6.

Figure 6:
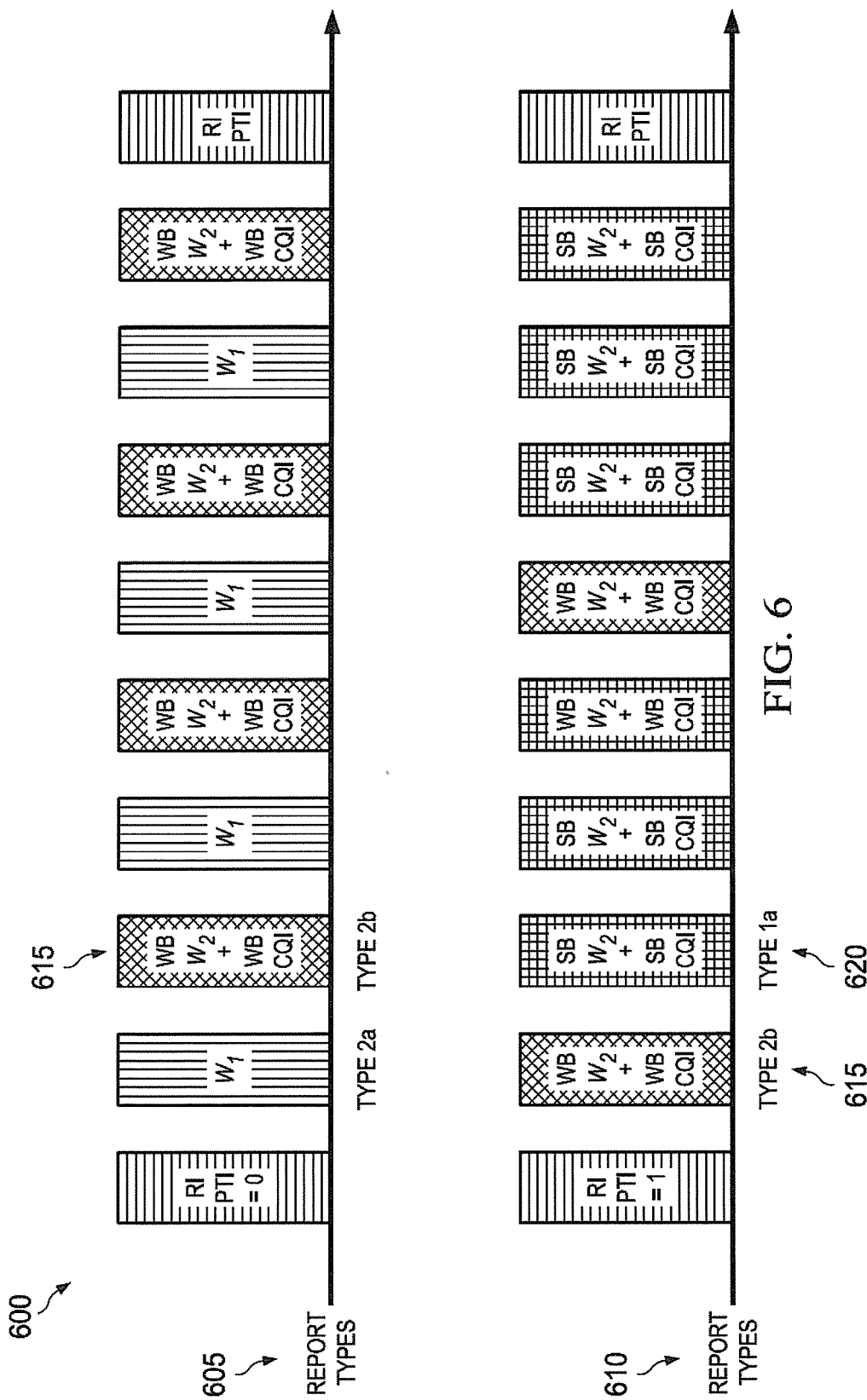
FIG. 6 illustrates PUCCH reporting based on PTI according to embodiments of the present disclosure.

FIG. 6 illustrates PUCCH reporting based on PTI according to embodiments of the present disclosure. The embodiment of the PUCCH reporting 600 shown in FIG. 6 is for illustration only. Other embodiments could be used without departing from the scope of this disclosure.

SS 116 provides reports on each of the DL component carriers: DL CC1 605 and DL CC2 610. Even though Type 2b report 615 is wideband report, the network 100 may decode the PTI value incorrectly, which will cause confusion for the Type 2b report 615 with Type 1a report 620. Therefore, the proposed priority class will resolve this particular confusion by assigning type 2b report 615 and type 1a report 620 to the same priority class.

In certain embodiments, each class of the report types includes one of the following priority rules:

Alternative 1: The priority within each report type class depends on the feedback mode. For example, within each report class, the feedback report for PUCCH Mode 1-1 (WB feedback mode) has a priority over PUCCH mode 2-1 (SB feedback mode). That is, for the first exemplary partition, the priority order for Class 1 reports is:

{Type 3 report, Type 5 report}>Type 6 report

Additionally, the feedback reports for PUCCH mode 1-1 submode 1 (WB feedback mode, RI+W1 feedback configured) have a priority over those for PUCCH mode 1-1 submode 2 (WB feedback mode, W1+W2 feedback configured). That is, for the same exemplary partition, for class 1 reports: Type 5 report>Type 3 report>Type 6 report. This priority order is because, within PUCCH mode 1-1, the type 5 report contains more information then the type 3 report.

Additionally, in some embodiments, the feedback reports for PUCCH mode 1-1 submode 2 (WB feedback mode, W1+W2 feedback configured) have a priority over those for PUCCH mode 1-1 submode 1 (WB feedback mode, RI+W1 feedback configured). That is, for the same exemplary partition, for class 1 reports: Type 3 report>Type 5 report>Type 6 report.

Alternative 2: The priority within each report type class depends on the component carrier ID (e.g., serving cell index). For example, within each report class, the feedback report for primary cell (Pcell) will be prioritized over feedback reports for all the other cells (Scells). As for the feedback reports for all the other cells (Scells), priority is defined based on the carrier ID. As an example, the feedback report for component carrier that has a lower carrier ID has a higher priority over that for component carrier that has a higher carrier ID.

In some embodiments, a priority order among report types is based on the feedback modes. That is, SS 116 partitions the report types in to different classes depending upon which feedback mode the report types belong. For all the feedback types listed in Document No. R1-106557, "CR0270 Introduction of Rel-10 features", the report types for each feedback mode can be listed as follows:

Report types for PUCCH 1-1 submode 1: Type 5 report and Type 2b report;

Report types for PUCCH 1-1 submode 2: Type 3 report, Type 2c report, Type 4 report;

Report types for PUCCH 2-1: Type 6 report, Type 1, Type 1a report, and Type 2a report; and Report types for PUCCH 2-0/1-0: Type 3 report and Type 4 report.

For example, the report types for PUCCH 2-0/1-0 can have the highest priority among all the feedback modes. Furthermore, the reports types for PUCCH 1-1 can have higher priority over those for PUCCH 2-1. This can be seen more clearly in the following relationship: Report types for PUCCH 2-0/1-0>Report types for PUCCH 1-1 submode 2>Report types for PUCCH 1-1 submode 1>Report types for PUCCH 2-1. Alternatively, Report types for PUCCH 2-0/1-0>Report types for PUCCH 1-1 submode 1>Report types for PUCCH 1-1 submode 2>Report types for PUCCH 2-1. This priority is because report types for PUCCH 2-0/1-0 only convey feedback information that is crucial for system operation whereas report types for other feedback modes convey more redundant CSI information for system optimization. Furthermore, the feedback content for PUCCH 1-1 is mainly on the wideband information while the feedback content for PUCCH 2-1 is mainly for subband information. Since wideband information is more important than the subband information, the priority of those report types for PUCCH 1-1 is defined to be over other report types for PUCCH 2-1.

In certain embodiments, within each class of the report types, the priority depends upon the component carrier ID. For example, within each report class, the feedback report for primary cell (Pcell) will be prioritized over feedback reports for all the other cells (secondary cells, or Scells). As for the feedback reports for all the other cells (Scells), priority is defined based upon the carrier ID. As an example, the feedback report for component carrier that has a lower carrier ID has a higher priority over that for component carrier that has a higher carrier ID.

In certain embodiments, a higher priority order among report types is based on the component carrier ID. For example, the report types for Pcell have the highest priority over other feedback types. Furthermore, report types of Scell with lower carrier IDs have higher priority over those of Scell with higher carrier IDs.

In certain embodiments, a priority order among report types is based on the payload of the report types. For example, the report type with a lower payload will have a higher priority. For those report types having a same payload, the priority can be based on one or more of component carrier ID and Pcell to determine the priority. By basing priority on the size of the payload, the selected PUCCH resource can be better protected since lower payload will also result in a higher probability of BS 102 successfully decoding the corresponding reported information.

Figure 7:
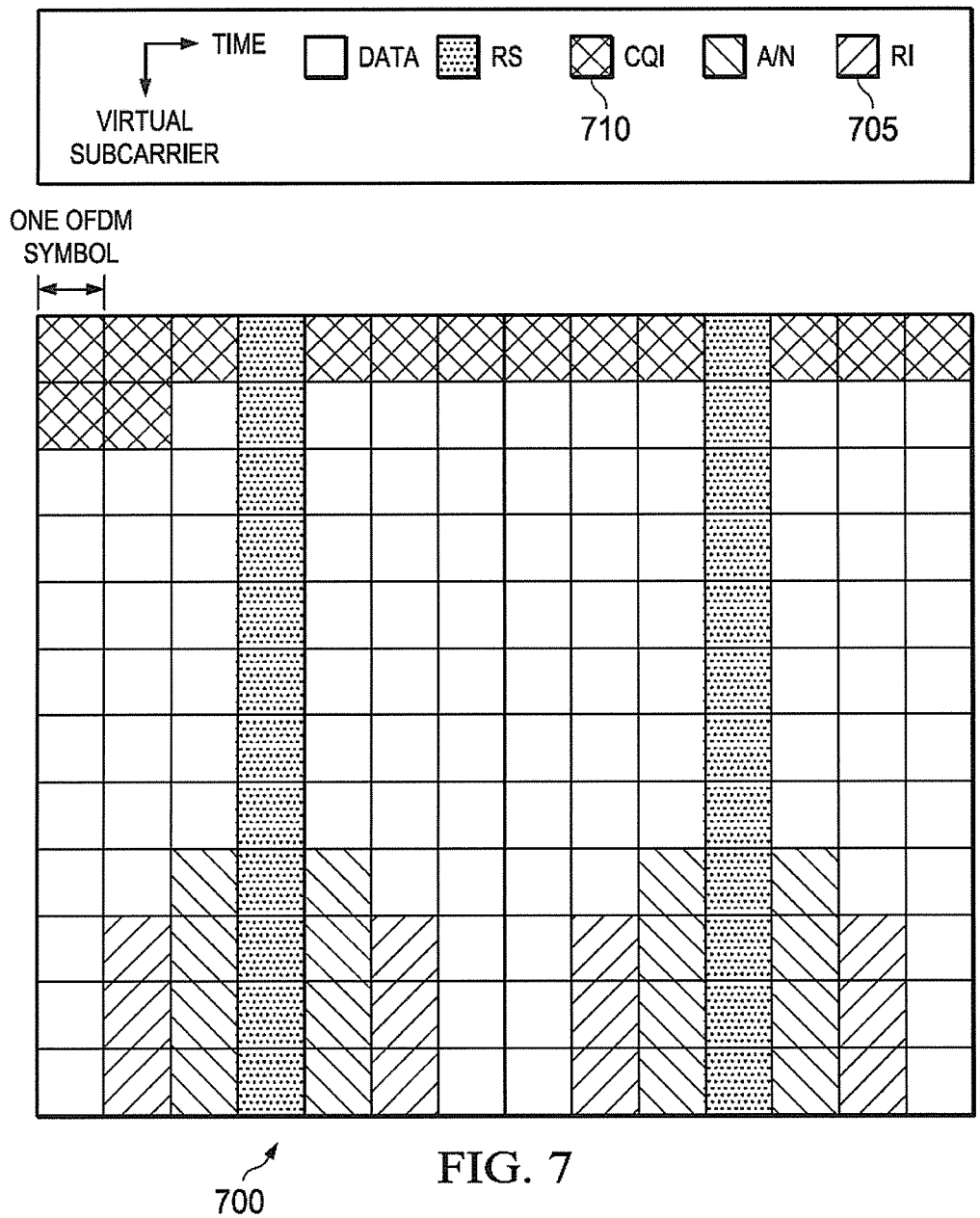
FIG. 7 illustrates uplink control information (UCI) mapping on PUSCH according to embodiments of the present disclosure.

FIG. 7 illustrates uplink control information (UCI) mapping on PUSCH according to embodiments of the present disclosure. The embodiment of the UCI mapping 700 shown in FIG. 7 is for illustration only. Other embodiments could be used without departing from the scope of this disclosure.

When a PUSCH resource is available, CQI/PMI/RI from multiple DL CCs will be reported together on PUSCH. That is, SS 116 needs to report CQI/PMI/RI from multiple DL CCs on the PUSCH.

In certain embodiments, when a number of CSI reports for SS 116 are scheduled in a subframe and a PUSCH is available to piggyback the multiple CSI reports, SS 116 can group the feedback content in the number of CSI reports into two categories: RI category and CQI/PMI category. The feedback contents in each category are jointly coded, and the modulation symbols generated from the coded bits are mapped to a corresponding region on PUSCH, either on an RI region 705 or CQI region 710 depending upon the category. Each of the number of CSI reports may contain a CSI feedback report for a DL CC.

If payload of the feedback content to be piggybacked on the RI region is greater than eleven bits, dual-RM code is used for encoding the feedback content. Therefore, the maximum payload that can be piggybacked in the RI region 705 is twenty-two bits. If five Type 5 reports are scheduled in a subframe, a twenty-five bit payload will be piggybacked in the RI region 710, which is not possible under conventional system.

Therefore, in certain embodiments, when a RI related report comprising RI and another feedback information and at least one PUSCH are scheduled for SS 116 in a subframe, the coding and mapping of the RI and the another feedback information can be performed using one of the following alternatives. In one example, the other feedback information is W1 in type 5 report. In another example, the other feedback information is PTI in type 6 report.

In a first alternative, alternative 1, information bits in an RI related report are jointly coded with the other CQI reports' information bits and mapped onto the CQI region 710 on a PUSCH. In one example, when only one type 5 report (RI+W1) is scheduled together with a PUSCH in a subframe, the single type 5 report is encoded by a (32,O) code and mapped onto the CQI region 710 on the PUSCH. In another example, when one type 5 report (RI+W1) and one type 1 report (SB CQI) are scheduled together with a PUSCH in a subframe, the information bits of the type 5 report and the type 1 report are combined. Then, the combined information bits are jointly coded by a channel code (either by the (32,O) code or a tail-biting convolutional code) and mapped onto the CQI region 710 on the PUSCH. In yet another example, when one type 5 report (RI+W1) and one type 3 report (RI) are scheduled together with a PUSCH in a subframe, the single type 5 report is encoded by a (32,O) code and mapped onto the CQI region on the PUSCH, while the single type 3 report is encoded by a channel code (either a (32,O) code or simplex code) and mapped onto the RI region 705 on the PUSCH.

When the RI related report is mapped onto the CQI region 710 on the PUSCH, a beta offset value can be adjusted to provide better protection of the jointly coded RI related reports. For example, the beta offset value for RI is used for determining the CQI region 710 size (in terms of resource elements) on the PUSCH in case an RI related report is mapped on to the CQI region 710. However, in a normal case, in which only the CQI/PMI is mapped onto the CQI region 710, the beta offset value for CQI is used for determining the CQI region 710 size (in terms of resource elements).

In a second alternative, Alternative 2, information in a RI related report are separated into two sets of information bits: RI and the another feedback content (such as W1 or PTI). The RI is mapped to the RI region 705, and the other feedback content is mapped to the CQI region 710 on the PUSCH.

In one example, only one type 5 report (RI+W1) is scheduled together with a PUSCH in a subframe. If no PUSCH had been scheduled in the subframe, then the RI+W1 would have been jointly mapped to a 5-bit information as shown in TABLE 1 and transmitted on the PUCCH:

TABLE 1

| Joint mapping of RI + W1 | | |
|---|---|---|
| hypotheses | RI | $i_1$ (W1) values |
| 0-7 | 1 | {0, 2, 4, 6, 8, 12, 14} |
| 8-15 | 2 | {0, 2, 4, 6, 8, 12, 14} |
| 16-17 | 3 | {0, 2} |
| 18-19 | 4 | {0, 2} |
| 20-21 | 5 | {0, 2} |
| 22-23 | 6 | {0, 2} |

TABLE 1-continued

Joint mapping of RI + W1

| hypotheses | RI | $i_1$ (W1) values |
|---|---|---|
| 24-25 | 7 | {0, 2} |
| 26 | 8 | {0} |
| 27-31 | reserved | NA |

Alternatively, since one PUSCH is scheduled in the subframe, the type 5 report can be piggybacked on the PUSCH. In order to piggyback the type 5 report composed of RI+W1, SS 116 splits the information into RI (a 3-bit RI: b11 b12 b13) and W1 (a 3-bit PMI: b21 b22 b23) as in TABLE 2:

TABLE 2

Splitting the RI + W1 information into RI and W1

| [b11 b12 b13] | RI | [b21 b22 b23] | $i_1$ (W1) values |
|---|---|---|---|
| 000 | 1 | 000 | 0 |
| 001 | 2 | 001 | 4 |
| 010 | 3 | 010 | 6 |
| 011 | 4 | 011 | 8 |
| 100 | 5 | 100 | 10 |
| 101 | 6 | 101 | 12 |
| 110 | 7 | 110 | 14 |
| 111 | 8 | 111 | 2 |

Thereafter, SS 116 places the re-encoded RI (b11, b12, b13) is placed in the RI region 705 while the re-encoded W1 (b21, b22, b23) is placed in the CQI region 710 on the PUSCH.

In another example, when one type 5 report (RI+W1) and one type 1 report (SB CQI) are scheduled together with a PUSCH in a subframe, SS 116 combines the re-encoded W1 bits (b21, b22, b23) of the type 5 report and bits from the type 1 report. Then, SS 116 jointly codes the combined information bits by a channel code (either by the (32,0) code or a tail-biting convolutional code). Thereafter, SS 116 maps the jointly coded combined information bits onto the CQI region 710 on the PUSCH; and maps the re-encoded RI bits (b11, b12, b13) to the RI region 705 on the PUSCH.

In another example, when one type 5 report (RI+W1) and one type 3 report (RI) are scheduled together with a PUSCH in a subframe, SS 116 encodes the re-encoded W1 bits (b21, b22, b23) of the type 5 report by a (32,0) code and maps the re-encoded W1 bits onto the CQI region 705 on the PUSCH. Additionally, SS 116 encodes the re-encoded RI bits (b11, b12, b13) and the bits from the one type 3 report by a channel code (either a (32,O) code or simplex code) and maps the re-encoded RI bits (b11, b12, b13) and the bits from the one type 3 report onto the RI region 705 on the PUSCH.

In a third alternative, alternative 3, SS 116 encodes the three most significant bits in for type 5 reports together with other RI related information. SS 116 places jointly coded bits in the RI region 705 while jointly encoding the remaining payloads of the type 5 reports together with other PMI/CQI related information and placing them in the CQI region 710.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of reporting channel characteristics of at least two component carriers to at least one base station in a wireless communication, the method comprising:
    performing periodic channel state information (CSI) reporting regarding the at least two component carriers on at least two individually configured physical uplink control channels (PUCCHs),
    wherein, in case that a collision between a first CSI report of a first report type on a first of the at least two PUCCHs and a second CSI report of a second report type on a second of the at least two PUCCHs occurs in a subframe,
        if priorities allocated to the first report type of the first CSI report and the second report type of the second CSI report are different, the performing periodic CSI reporting comprises transmitting a CSI report having a higher priority among the first CSI report and the second CSI report, wherein a highest priority is assigned to a report type including wideband precoding matrix indicator (PMI), and
        if priorities allocated to the first report type of the first CSI report and the second report type of the second CSI report are the same, the performing periodic CSI reporting comprises transmitting a CSI report corresponding to a primary cell among the first CSI report and the second CSI report.

2. The method of claim 1, wherein each of the priorities are determined based on classes to which the first CSI report and the second CSI report belong,
    wherein the classes comprise a first class having a highest priority, a third class having a lowest priority, and a second class having a priority that is lower than the first class and is higher than the third class,
    wherein the first class comprises: a type 2a report, a type 3 report, a type 5 report and a type 6 report,
    wherein the second class comprises: a type 2 report, a type 2b report, a type 2c report and a type 4 report, and
    wherein the third class comprises: a type 1 report and a type 1a report.

3. A subscriber station for reporting channel characteristics of at least two component carriers to at least one base station in a wireless communication network, the subscriber station comprising:
    a transmitter configured to transmit periodic channel state information (CSI) reports; and
    a controller configured to perform periodic CSI reporting regarding the at least two component carriers on at least two individually configured physical uplink control channels (PUCCHs),
    wherein, in case that a collision between a first CSI report of a first report type on a first of the at least two PUCCHs and a second CSI report of a second report type on a second of the at least two PUCCHs occurs in a subframe,
        if priorities allocated to the first report type of the first CSI report and the second report type of the second CSI report are different, the controller is configured to cause the transmitter to transmit a CSI report having a higher priority among the first CSI report and the second CSI report, wherein a highest priority is assigned to a report for a wideband precoding matrix indicator (PMI), and
        if priorities allocated to the first report type of the first CSI report and the second report type of the second CSI report are the same, the controller is configured to cause the transmitter to transmit a CSI report corresponding to a primary cell among the first CSI report and the second CSI report.

4. The subscriber station of claim 3, wherein each of the priorities are determined based on classes where the first report type and the second report type belong,
wherein the classes comprise a first class having a highest priority, a third class having a lowest priority, and a second class having a priority that is lower than the first class and is higher than the third class,
wherein the first class comprises: a type 2a report, a type 3 report, a type 5 report and a type 6 report,
wherein the second class comprises: a type 2 report, a type 2b report, a type 2c report and a type 4 report, and
wherein the third class comprises: a type 1 report and a type 1a report.

5. A method for receiving channel characteristics of at least two component carriers from a subscriber station in a wireless communication, the method comprising:
receiving periodic channel state information (CSI) reporting regarding the at least two component carriers on at least two individually configured physical uplink control channels (PUCCHs),
wherein, in case that a collision between a first CSI report of a first report type on a first of the at least two PUCCHs and a second CSI report of a second report type on a second of the at least two PUCCHs occurs in a subframe,
if priorities allocated to the first report type of the first CSI report and the second report type of the second CSI report are different, the receiving periodic CSI reporting comprises receiving a CSI report having a higher priority among the first CSI report and the second CSI report, wherein a highest priority is assigned to a report for a wideband precoding matrix indicator (PMI), and
if priorities allocated to the first report type of the first CSI report and the second report type of the second CSI report are the same, receiving one of the first CSI report and the second CSI report comprises receiving a CSI report corresponding to a primary cell among the first CSI report and the second CSI report.

6. The method of claim 5, wherein each of the priorities are determined based on classes to which the first CSI report and the second CSI report belong,
wherein the classes comprise a first class having a highest priority, a third class having a lowest priority, and a second class having a priority that is lower than the first class and is higher than the third class,
wherein the first class comprises: a type 2a report, a type 3 report, a type 5 report and a type 6 report,
wherein the second class comprises: a type 2 report, a type 2b report, a type 2c report and a type 4 report, and
wherein the third class comprises: a type 1 report and a type 1a report.

7. A base station for receiving channel characteristics of at least two component carriers from at least one subscriber station in a wireless communication network, the base station comprising:
a transceiver configured to receive channel state information (CSI) reports; and
a controller configured to perform evaluation of CSI reporting regarding the at least two component carriers on at least two individually configured physical uplink control channels (PUCCHs),
wherein, in case that a collision between a first CSI report of a first report type on a first of the at least two PUCCHs and a second CSI report of a second report type on a second of the at least two PUCCHs occurs in a subframe,
if priorities allocated to the first report type of the first CSI report and the second report type of the second CSI report are different, the transceiver is configured to receive a CSI report having a higher priority among the first CSI report and the second CSI report, wherein a highest priority is assigned to a report for a wideband precoding matrix indicator (PMI), and
if priorities allocated to the first report type of the first CSI report and the second report type of the second CSI report are the same, the transceiver is configured to receive a CSI report corresponding to a primary cell among the first CSI report and the second CSI report.

8. The base station of claim 7, wherein each of the priorities are determined based on classes to which the first CSI report and the second CSI report belong,
wherein the classes comprise a first class having a highest priority, a third class having a lowest priority, and a second class having a priority that is lower than the first class and is higher than the third class,
wherein the first class comprises: a type 2a report, a type 3 report, a type 5 report and a type 6 report,
wherein the second class comprises: a type 2 report, a type 2b report, a type 2c report and a type 4 report, and
wherein the third class comprises: a type 1 report and a type 1a report.

* * * * *